June 14, 1927.
M. E. FERNALD
1,632,396
METHOD OF CUTTING LEADERS, GEARS, OR RACKS
Filed Jan. 3, 1923 4 Sheets-Sheet 4
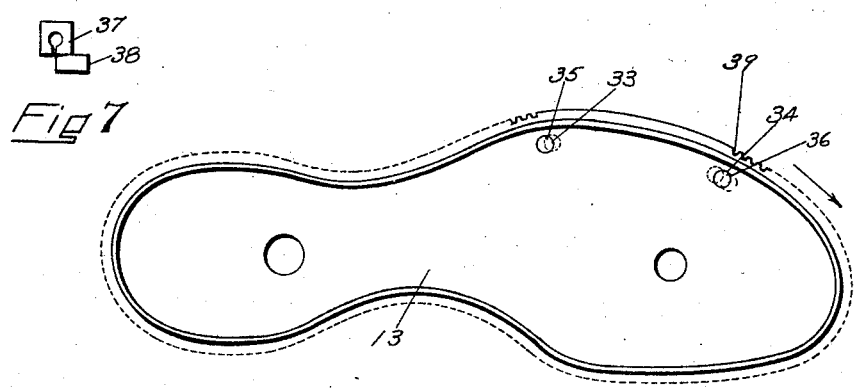
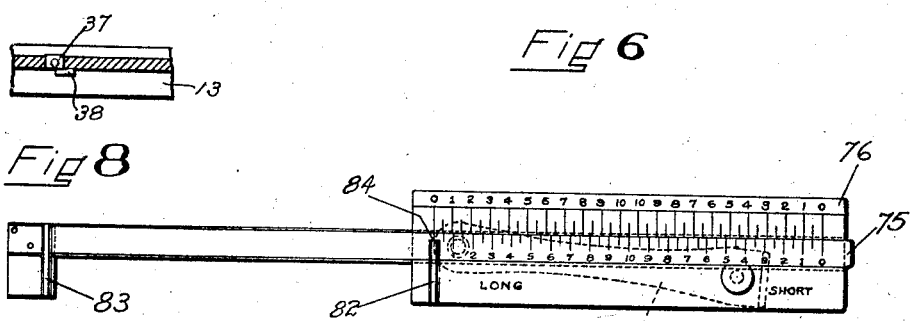
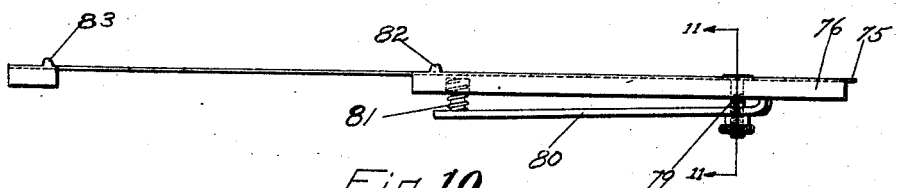
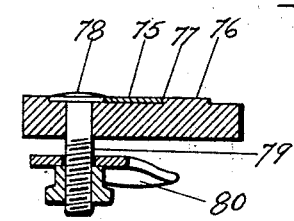

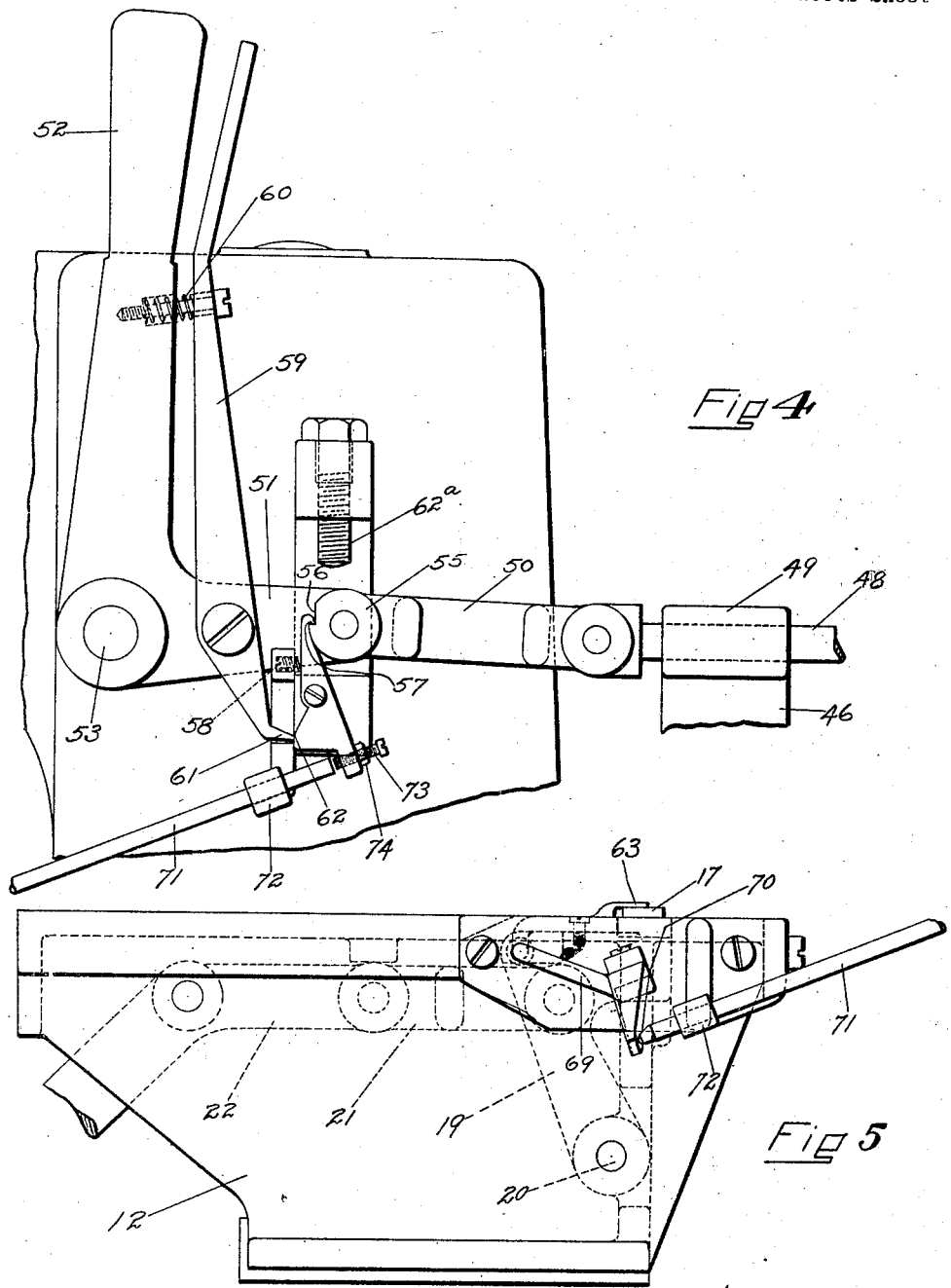

Patented June 14, 1927.

1,632,396

UNITED STATES PATENT OFFICE.

MARK E. FERNALD, OF SOUTHBORO, MASSACHUSETTS, ASSIGNOR TO C. C. BLAKE, INCORPORATED, OF BOSTON, MASSACHUSETTS, A CORPORATION OF NEW YORK.

METHOD OF CUTTING LEADERS, GEARS, OR RACKS.

Application filed January 3, 1923. Serial No. 610,442.

The present invention relates to the art of cutting teeth on leaders, gears, racks, and similar machine elements which are provided with teeth or some equivalent members by which they are fed or by which they feed some other member. Specifically, the invention relates to the art of cutting teeth on sole-shaped leaders which are used in the manufacture of Blake welt shoes to guide the work through an automatic shoe machine during its operation upon the shoe or a step product thereof. These sole shaped leaders vary in size and style with the various sizes and styles of the insoles of the shoes to be operated upon and consequently the peripheries of the leaders vary in length.

Heretofore, in plotting the teeth on the leader, the length of its periphery would first be determined and then this dimension would be divided by the number of desired teeth to determine the circular pitch or distance between tooth centers necessary to evenly space the desired number of teeth around the periphery of the leader. As these peripheries vary in length, it is apparent that a circular pitch which would evenly space the teeth around one leader would cause an error in the spacing of the teeth on another leader designed for a different size or style of shoe.

The object of the present invention is to devise a method of cutting teeth on leaders, gears and racks in which a standard circular pitch may be employed for all the varying sizes of the machine elements of this general class, while permitting substantially an even spacing of the teeth around the varying peripheries.

To the accomplishment of this object and such others as may hereafter appear, a feature of the present invention consists in a method of making leaders, gears and racks which consists in providing a suitable blank for a leader, gear or rack; cutting teeth having a predetermined circular pitch along said blank; stopping the cutting of said teeth with the blank short a predetermined number of teeth; determining the amount of the circular pitch necessary to evenly space the said predetermined number of teeth in the remaining uncut portion of the blank, and then cutting the said predetermined number of teeth having the determined circular pitch to finish the blank. With this method, the error, if any, is found and divided up among all the predetermined number of teeth. In some cases, the new circular pitch will be slightly more than the predetermined circular pitch and in some cases, the new circular pitch will be less. In every case, however, the new circular pitch will vary but slightly from the predetermined circular pitch so no difficulty will be experienced in driving the finished leaders in the automatic shoe machines.

I propose to practice the improved method of making leaders, gears and racks in connection with the machine disclosed in my Patent No. 1,284,882, patented November 12, 1918. I propose to insert a suitable blank for the leader, gear or rack into this machine and to adjust the feed thereof in accordance with a predetermined circular pitch for the teeth and then stop the cutting operation of this machine with the blank short a predetermined number of teeth. I then propose to measure the space between the first and last cuts and then determine from this measurement what circular pitch is required to evenly space the predetermined number of teeth in the uncut portion of the blank, and then to readjust the feed of the machine to impart the new determined circular pitch to the teeth in the uncut portion of the blank when the cutting operation of the machine is resumed.

The various features of the present invention will be readily understood from an inspection of the accompanying drawings in which:

Figure 4 is a detail in right side elevation of the clutch actuator and trip;

Figure 5 is a view similar to Figure 4 showing the connections between the clutch actuator and trip and the automatic stop;

Figure 6 is a plan of a sole shaped leader blank having the teeth formed on the periphery thereof, but leaving the blank short a predetermined number of teeth;

Figure 7 is a detail of one of the leader cams or trips;

Figure 8 is a sectional elevation showing the cam or trip in place on the leader;

Figure 9 is a plan of a vernier used in determining the circular pitch in the remaining uncut portion of the blank;

Figure 10 is a side elevation of the vernier; and

Figure 11 is a sectional elevation on the line 11—11, Fig. 10.

Figure 1:
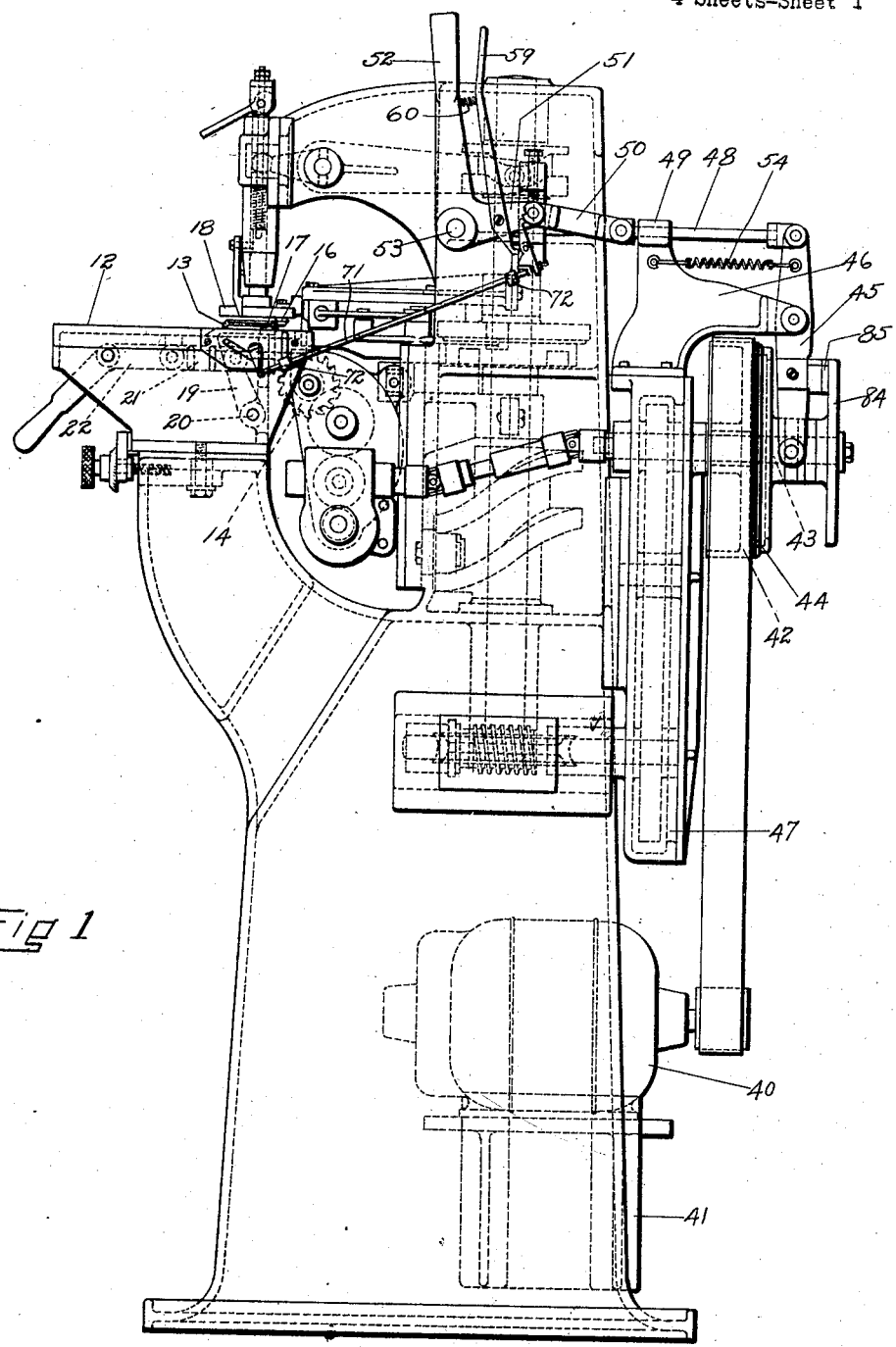
Figure 1 is a right side elevation of a machine for use in practicing the present invention.

Briefly described, the machine shown comprises a work supporting table 12 (Fig. 1) on the surface of which the leader blank 13 is freely movable; a cutter 14 arranged to move up and down past said table and operative to make tooth-cuts in the peripheral edge of the blank; a work feeding finger 15 (Fig. 2) which operates on each tooth cut immediately after it is formed to feed the blank past the cutter into position for the next cut; additional mechanism 16 and 17 (Figs. 1 and 2) that acts on the blank to position it in the proper angular relationship to the cutter for the next cut; and a clamp 18 which holds the work in the new position to which it is adjusted by these mechanisms while the cutter makes a tooth-cut and then releases the work again for the next feeding and positioning movements.

The inside stud 17 is mounted on a bell crank lever 19 (Figs. 1 and 5) which is fulcrumed on a pin 20 supported by a part of the table 12. A link 21 and a bell crank lever 22, one arm of which forms a handle and the other arm of which is pivoted to the link 21, constitute a toggle mechanism designed to hold the stud 17 in a fixed position against the inside face of the flange on the leader 13.

Figure 2:
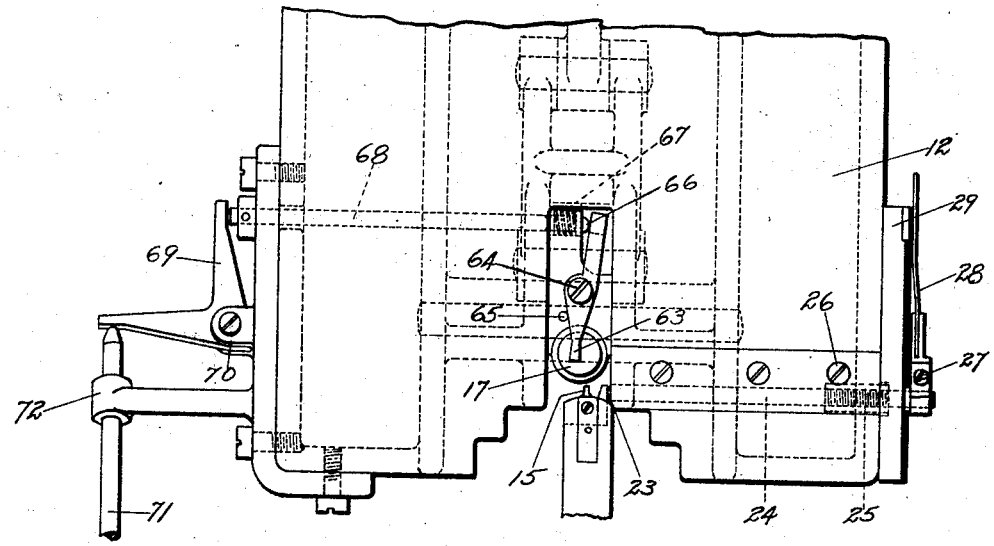
Figure 2 is a detail in plan of the feeding finger and automatic stop of the machine.
Figure 3:
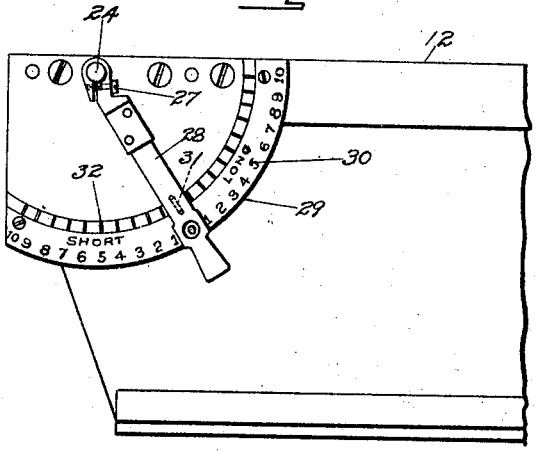
Figure 3 is a detail in left side elevation of the regulator for regulating the feed of the machine.

In the machine illustrated in the drawings, the extent of the feeding movement of the finger 15 (Fig. 2) is controlled by a stop 23 formed on one end of a rod 24 which extends through the sides of the table 12. Near one end, the rod 24 is threaded to rotate in a nut 25 which is normally held from rotation by a screw 26. The free end of the rod 24 is secured by a screw 27 to an arm 28 (Figs. 2 and 3) which extends over a sector 29 having a scale 30 thereon. The arm 28 is sufficiently flexible to permit a tooth 31 thereon to be lifted out of engagement with one of a series of slots 32 adjacent the scale when it is desired to move the arm 28 along the scale. The tooth 31 by engagement with one of the slots 32 locks the arm in any position of adjustment. The construction and arrangement of the connections between the arm 28 and the stop 23 provides a very fine adjustment of the extent of the feeding movement of the leader blank. Consequently, the stop 23 should be set in accordance with the circular pitch of the teeth to be cut in the leader.

In preparing the leader blanks for operation by the machine of the drawings the leader blanks are provided with a pair of holes 33 and 34 (Fig. 6). These holes are drilled in the leader blanks with the aid of a jig (not shown) which is constructed to space the holes a distance equal to a predetermined number of teeth, for instance, twenty, having a predetermined circular pitch.

After the holes 33 and 34 are formed, a pair of trips or cams 35 and 36 are inserted therein. Each of the trips comprises an expansible body portion 37 (Fig. 7) and an offset portion 38 arranged to engage the bottom face of the leader blank. When the trips are first inserted into the holes the offset portions 38 are oppositely disposed relatively. That is, the offset portion 38 on the trip 35 is arranged on the right of the center of the body portion 37, while the offset portion 38 on the trip 36 is arranged on the left of the center of the body portion.

The leader blank, with the trips in place thereon, is now inserted into the machine with the stop 23 adjusted to permit the feed to impart a predetermined circular pitch to the teeth. The leader blank is so positioned in the machine that the first tooth cut will be the one marked 39 (Fig. 6) and the direction of feed is such that the cutting of the teeth will proceed in the direction of the arrow.

In order to automatically stop the machine with the blank short the twenty teeth, the machine is provided with an automatic stop which operates upon engagement with the trip 35 to throw the driving mechanism out of action.

The machine may be driven in any convenient manner. In the arrangement shown an electric motor 40 is supported on a suitable bracket 41 mounted on the machine base and is belted to a pulley 42 loosely mounted on the main shaft 43. This pulley is designed to be operatively connected to the main shaft 43 by a clutch 44 splined on the shaft. The hub of the clutch is provided with a yoke and strap connection with an arm 45 which is pivoted on a bracket 46 carried by the gear housing 47. The upper end of the arm 45 is pivoted to a rod 48 which slides loosely through a boss 49 formed on the bracket 46. The rod 48 is pivoted to one end of a link 50 the other end of which is pivoted to the horizontal arm 51 of a bell crank lever handle 52 pivoted at 53 on the machine frame. The arm 51 and link 50 constitute a toggle which when made through manipulation of the handle 52, actuates the clutch 44 to throw the driving mechanism into action. When the clutch is actuated, a spring 54 connecting the bracket 46 and arm 45 is tensioned.

In order to hold the toggle in its made position against the tension of the spring 54 a boss 55 on the link 50 is provided with a notch 56. The notch 56 is engaged by a hook 57 pivoted on the machine frame. The hook 57 is actuated in a direction to engage the notch 56 by a spring 58. The hook 57 may be manually tripped in order to restore the toggle to the influence of the spring 54 by a bell crank 59, pivoted on the arm 51, and normally held separated from the handle 52 by a spring 60 interposed between the bell cranks. The lower end of the arm 59 is provided with a foot 61 which, when the toggle is made, rests against a cam surface 62 formed on the hook 57. With this construction, actuation of the bell crank 59 towards the handle 52 against the tension of the spring 60 causes the foot 61 engaged with the cam surface 62 to turn the hook 57 on its pivot out of engagement with the notch 56. The spring 54 thus is free to break the toggle and withdraw the clutch 44 from driving engagement with the driving mechanism. To limit the movement of the toggle when it is broken, the machine frame carries an adjusting screw 62$^a$ which limits the upward movement of the arm 51.

In order to automatically disengage the hook 57 from the notch 56 and thus automatically throw the driving mechanism out of action, a stop 63 (Fig. 2) is positioned to extend above the stud 17. The stop 63 is pivoted at 64 (Fig. 2) on the bell crank 19 and is normally held against a pin 65 on the bell crank 19 by a spring pressed pin 66 working in a chamber 67 formed in the bell crank 19. When the stud 17 is in operative position, the pin 66 engages a rod 68 which slides through the table 12 below the surface thereof.

The rod 68 at the point where it extends outside the side of the table 12 engages one arm of a bell crank lever 69 pivoted on a bracket 70 carried by the side of the table 12. The other arm of the bell crank lever 69 engages one end of a rod 71 mounted to slide freely in brackets 72 carried by the side of the table 12 and machine frame respectively (Fig. 1). The other end of the rod 71 (Fig. 4) engages a screw 73 carried by the lower end of the hook 57. A lock nut 74 secures the screw 73 in its adjusted position.

With the construction described, the machine automatically cuts teeth around the periphery of the blank until the stop 63 strikes against the offset portion 38 of the trip 35. When this occurs, the rod 68 is moved to the left (Fig. 2) and operates, through the bell crank lever 69 and rod 71, the hook 57 to restore the toggle to the influence of the spring 54 which breaks the toggle and throws the driving mechanism out of action.

With the machine stopped, the operative measures the distance on the blank between the first and last cuts in order to find the distance in which it is necessary to evenly space the remaining twenty teeth. The operative may find upon measuring the space referred to that no change in the circular pitch just used to cut the teeth is required, or he may find that the space is too long or too short for the twenty teeth. If the space is too long, the excess space is found and divided by twenty in order to find the amount to be added to the circular pitch in order to evenly space the twenty teeth. Conversely, if the space is too short for the twenty teeth, the amount which the space is short is divided by twenty to find the amount to be subtracted from the present circular pitch in order to evenly space the twenty teeth. In any case, whether the space is too long or too short, the error when divided up among the twenty teeth is very small and consequently no substantial change is made in the circular pitch.

To provide the operative with an easy way to immediately determine the new circular pitch by inspection, the instrument shown in Figs. 9 and 10 is provided. This instrument is provided with a true scale 75 and a vernier scale 76. The true scale 75 slides in ways 77 (Fig. 11) formed in the vernier scale 76. The true scale 75 is held in any position of adjustment by a head 78 arranged to pass through the vernier scale 76 and wedge against the true scale 75. The head 78 is formed on a bolt 79 which passes loosely through an arm 80 one end of which engages the bottom of the vernier scale 76. The other end of the arm 80 is engaged by a spring 81, the construction being such as to wedge the head 78 against the true scale 75. To release the pressure on the true scale 75, the operative merely presses the spring-pressed end of the arm 80 thus releasing the pressure and permitting the true scale 75 to slide freely in the vernier scale.

The vernier scale 76 is provided with a tooth 82 and the true scale 75 is provided with a tooth 83. The teeth 82 and 83 are arranged to engage the first and last cuts respectively in the leader blank to measure the space remaining uncut. The true and vernier scales are of equal length, although the true scale is provided with twenty equal divisions, while the vernier scale is provided with twenty-one equal divisions. The vernier scale is also divided into a long side and a short side. With this instrument, two divisions on the true scale will always be opposite two divisions on the vernier scale but if the tooth 82 is on the right of the zero mark 84 on the true scale, the operative takes the two divisions on the long side for the reading. Conversely, if the tooth 82 is on the left of the zero mark 84 on the true scale, then the operative takes the two divisions on the short side for the reading. This reading may be 5 short or 3 long, for instance. If it is 5 short, the operative shifts the arm 28 (Fig. 3) to 5 on the short side of the scale 30. If it is 3 long, the operative shifts the arm 28 to 3 on the long side of the scale 30. In doing this, the operative adjusts the feed of the machine so that when the machine is restarted, it will cut 20 teeth evenly spaced in the now uncut portion of the blank.

Before restarting the machine, the operative removes the trip 33 and shifts the trip 34 around so that the offset portion 38 thereon is positioned on the right of the center of the trip (Fig. 6). The machine will then automatically cut the twenty teeth in the blank, whereupon the stop 63 will, upon engagement with the trip 36, automatically stop the machine through the connection with the hook 57. The finished blank is then removed from the machine and the arm 28 shifted back to the zero mark on the scale 29.

In the event that the machine has been taken down for repairs and it is desirable to set the feed for a standard pitch preliminary to cutting teeth on leader blanks, a trial blank is inserted into the machine and twenty teeth cut therein. These teeth are then measured on the instrument shown in Figs. 9 and 10, the reading of which will indicate the adjustment, if any, necessary to make the feed of the machine in order for it to provide the teeth with the standard circular pitch. If the reading on the instrument is 6 long, then in order to bring the feed of the machine to the right adjustment, the operative first makes sure that the screw 26 (Fig. 2) is tight and then loosens the screw 27 which secures the arm 28 to the rod 24 and swings the arm to 6 long. The operative then loosens screw 26 and tightens screw 27 and brings the arm 28 back to zero, thereafter tightening screw 26.

It is highly desirable in machines of this general class in which the work is engaged by a plurality of operating instrumentalities to stop the machine in a predetermined position with the operating devices out of contact with the work and thus enable the operative to withdraw the work readily. To this end, the arm 45 (Fig. 1) carries a shoe 85 which when the toggle is broken is engaged with a brake 84 on the shaft 43. As the automatic stop operates during the feed of the leader, at which time the cutter 14 and clamp 18 are out of contact with the work, the brake operates to stop the machine at a time when the work is free to be withdrawn from the table 12.

While the number of teeth left uncut in the blank at the time of the first automatic stopping of the machine is described as twenty, it must be understood that this number is arbitrary as the method of cutting leaders, gears or racks herein disclosed may be practised successfully by adopting any other number of teeth with the general limitation that the number of teeth selected be sufficient to apportion the error so that for each tooth, the variation from the circular pitch be very small.

It will also be understood that the invention is not limited to the specific embodiment thereof, herein shown and described, but that the foregoing description and illustration is intended merely to set forth the underlying principles of the invention and to disclose one satisfactory form that the invention may take.

What is claimed as new, is:—

1. That improvement in the process of making leaders, gears and racks which consists in providing a suitable blank for a leader, gear or rack; cutting teeth having a predetermined circular pitch along said blank; stopping the cutting of said teeth with the blank short a predetermined number of teeth; determining the amount of circular pitch necessary to evenly space the said predetermined number of teeth in the remaining uncut portion of the blank, and then cutting the said predetermined number of teeth having the determined circular pitch to finish the blank.

2. That improvement in the process of making leaders, gears and racks which consists in providing a suitable blank for a leader, gear or rack; cutting teeth having a predetermined circular pitch along said blank; stopping the cutting of said teeth with the blank short a predetermined number of teeth; measuring the uncut portion on the blank and dividing this length by the predetermined number of teeth to determine the amount of circular pitch necessary to evenly space the said predetermined number of teeth in the remaining uncut portion of the blank; and then cutting the said predetermined number of teeth having the determined circular pitch to finish the blank.

3. That improvement in the process of making leaders, gears and racks which consists in providing a suitable blank for a leader, gear or rack; inserting the blank into a cutting machine having its feed adjusted to a predetermined circular pitch, operating the machine to cut teeth having the predetermined circular pitch along said blank; automatically stopping the machine when the blank has been provided with all but a predetermined number of teeth; measuring the distance remaining uncut on the blank to determine the amount of circular pitch necessary to evenly space the said predetermined number of teeth in the remaining uncut portion of the blank; changing the feed of the machine in accordance with the determined circular pitch; restarting the machine to cut the said predetermined number of teeth having the determined circular pitch, and automatically stopping the machine upon the completion of the cutting of said predetermined number of teeth.

4. That improvement in the process of making leaders, gears and racks which consists in providing a suitable blank for a leader, gear or rack; providing the blank with a pair of trips or cams spaced apart a distance equal to a predetermined number of teeth having a predetermined circular pitch; inserting the blank into a cutting machine having its feed adjusted to the predetermined circular pitch; operating the machine to cut teeth having the predetermined pitch along said blank; stopping the machine upon engagement with one of the trips; measuring the distance remaining uncut on the blank to determine the amount of circular pitch necessary to evenly space the said predetermined number of teeth in the remaining uncut portion of the blank; changing the feed of the machine in accordance with the determined circular pitch; restarting the machine to cut the said predetermined number of teeth having the determined circular pitch, and stopping the machine upon engagement with the second trip on the blank.

5. A machine for use in the manufacture of shoes, having, in combination, a leader, an operating tool, driving mechanism connected with one of said parts to cause the point of operation of the tool to be transferred around the leader, and means controlled by the leader for throwing the driving mechanism out of action.

6. A machine for use in the manufacture of shoes, having, in combination, a leader, a stopping device thereon, an operating tool, driving mechanism for moving the leader to transfer the point of operation of the tool around the leader, and means operated by the stopping device for throwing out the driving mechanism.

7. That improvement in the art of adjusting a machine for cutting leaders, gears, and racks which consists in inserting a trial blank in the machine and cutting a predetermined number of teeth thereon, stopping the machine and determining the variations, if any, in the circular pitch in the teeth cut from a predetermined circular pitch, and then adjusting the feed of the machine to compensate for the determined error.

8. A machine for use in the manufacture of shoes, having, in combination, a leader, an operating tool, driving mechanism for moving the leader to transfer the point of operation of the tool around the work, devices operating during the movement of the leader for throwing the driving mechanism out of action, and means for bringing the machine to rest with the operating tool withdrawn from the work.

9. A machine for use in the manufacture of shoes, having, in combination, a leader, an operating tool, driving mechanism for moving the leader to transfer the point of operation of the tool around the work, means controlled by the leader for throwing the driving mechanism out of action, and means for bringing the machine to rest with the operating tool withdrawn from the work.

10. A machine for use in the manufacture of shoes, having, in combination, a sole-shaped blank, an operating tool, driving mechanism for moving the blank to transfer the point of operation of the tool around the blank, and devices for throwing the driving mechanism out of action operating at any desired point along the periphery of the blank.

In testimony whereof I have signed my name to this specification.

MARK E. FERNALD.